Aug. 18, 1931.  C. C. HARRAH  1,819,747
TIRE BEAD REENFORCING ELEMENT
Filed July 5, 1929
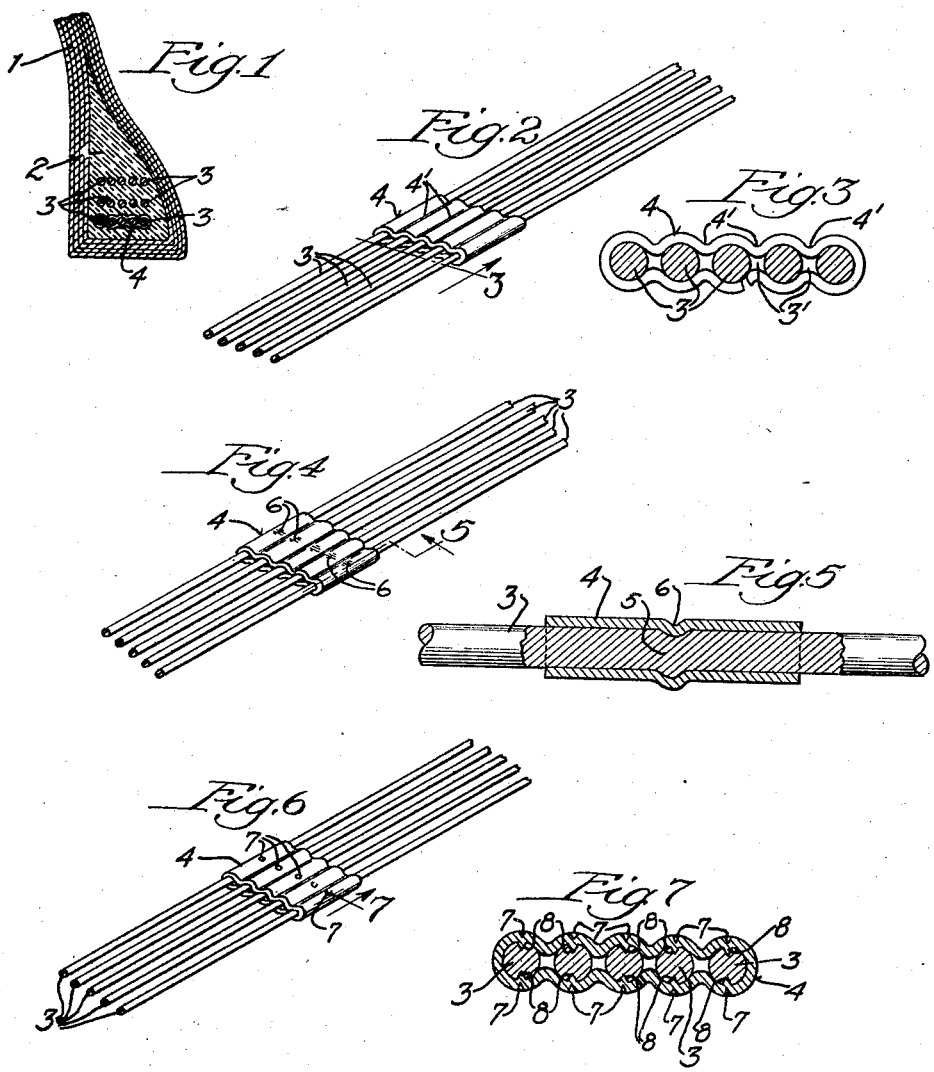

Patented Aug. 18, 1931

1,819,747

UNITED STATES PATENT OFFICE

CLAYTON C. HARRAH, OF NILES, MICHIGAN, ASSIGNOR TO NATIONAL-STANDARD COMPANY, OF NILES, MICHIGAN, A CORPORATION OF MICHIGAN

TIRE-BEAD REENFORCING ELEMENT

Application filed July 5, 1929. Serial No. 376,203.

This invention relates to improvements in tire-bead reenforcing elements and, more especially, to such an element adapted for use in a bead of a casing for a pneumatic tire.

Among the features of my invention is the provision of a reinforcement or reenforcing element, which may be easily and cheaply manufactured and which has considerable tensile strength.

My improved reenforcing element is also so constructed that in the forming of a bead, the element will become imbedded and interlock with the rubber compound forming a part of the bead, thus making practically a unitary structure.

Another feature of my invention is improved means for holding the individual tension members in parallel spaced relationship. Such holding means can be easily and cheaply made.

Other features and advantages of my invention will appear more fully as I proceed with my specification.

In that form of device embodying the features of my invention shown in the accompanying drawings—

Figure 1 is a sectional view through the bead of a tire showing the reenforcing element in place; Fig. 2 is a view in perspective of a portion of the reenforcing element; Fig. 3 is a view taken as indicated by the line 3 of Fig. 2; Fig. 4 is a view similar to Fig. 2 showing a modified form; Fig. 5 is a view taken as indicated by the line 5 of Fig. 4; Fig. 6 is a view similar to Fig. 2 showing another modified form; and Fig. 7 is a view taken as indicated by the line 7 of Fig. 6.

As shown in the drawings, 1 indicates a conventional tire casing provided with the usual bead 2, which is formed of a suitable rubber composition, the bead being of a cross-section corresponding to the tire in which it is desired to use the same.

I shall now describe the reinforcement or reenforcing element. This includes a plurality of tension members, here shown, for example, as five wires, 3, 3. The tension members are held in spaced parallel relationship to form a sort of flat tape, by a plurality of clips, indicated in general by 4. It is to be understood that there may be as many of these clips as desired and that they may be spaced throughout the length of the element, as desired.

I shall now describe more in detail the clips or clamps 4. Each of the clamps 4 is preferably made out of a flat strip of metal which is more or less malleable so that it may be folded around the wires, as shown. These transversely arranged clamps are preferably crimped in slightly, as indicated by 4', between the wires 3 above and below the tape so as to space the wires from each other, as shown clearly in Fig. 3, where I have indicated the spaces between the wires by 3'. Rubber compound is permitted to enter the spaces between the wires in the making of the tire, thus interlocking and imbedding the tape more securely in the material of the tire bead.

In the form of device shown in Figs. 2 and 3, the clamps 4 may be locked against longitudinal displacement on the element by friction. In the form of device shown in Figs. 4 and 5, I have shown slight kinks or bends formed in the wires and clamp, to interlock the same and prevent longitudinal displacement of the clamp. These kinks may be formed in any suitable manner and I have indicated the kink in the wire by the numeral 5 and the cooperating kink in the clamp 4 by the numeral 6.

In Figs. 6 and 7, I have shown other means for preventing longitudinal displacement of the clamp on the wires 3. As here shown, such means includes punch marks 7 formed in the clamp material 4 above and below each wire, said punch marks or indentations driving the material 4 part way into the wire, as indicated by 8, to lock the clamp on the wires and prevent sliding movement of the same.

In using the element in the tire, the same is convolutely disposed in the tire bead, as many turns as desired being formed. In making my bead, for example, there may be three wraps or convolutions of the element, as shown in Fig. 1. If desired, these wraps may be made on the mandrel, form, or drum, as the bead is being made up, or the element may be so disposed apart from the bead and formed into a completed annulus which is inserted in the bead as the same is formed.

Obviously, the element may be coated or impregnated with a suitable rubber compound, as is well known in the art, before being inserted in the bead.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. A tire-bead reenforcing element, including a plurality of substantially parallel adjacent tension members held in parallel relationship by a plurality of transversely arranged clamping strips crimped around the same, the clamping strips being held against longitudinal displacement on the tension members by cooperating indentations in the clamping strips and the tension members.

2. A tire-bead reenforcing element, including a plurality of substantially parallel adjacent tension members held in parallel spaced relationship by a plurality of transversely arranged clamping strips crimped around the same, the clamping strips being held against longitudinal displacement on the tension members by cooperating indentations in the clamping strips and the tension members.

3. A tire-bead reenforcing element, including a plurality of substantially parallel adjacent tension members held in parallel relationship by a plurality of transversely arranged flat metal clamping strips crimped around the same, the clamping strips being held against longitudinal displacement on the tension members by cooperating indentations in the clamping strips and the tension members.

4. A tire-bead reenforcing element, including a plurality of substantially parallel adjacent tension members held in parallel spaced relationship by a purality of transversely arranged flat metal clamping strips crimped around the same, the clamping strips being held against longitudinal displacement on the tension members by cooperating indentations in the clamping strips and the tension members.

In witness whereof, I have hereunto set my hand and seal this 28th day of June, 1929.

CLAYTON C. HARRAH.